3,360,683
SOLID-STATE PULSE GENERATOR FOR
ELECTRIC-DISCHARGE MACHINING
Kiyoshi Inoue, 100 Sakato, Kawasaki,
Kanagawa, Tokyo, Japan
Filed Oct. 6, 1965, Ser. No. 493,473
2 Claims. (Cl. 315—209)

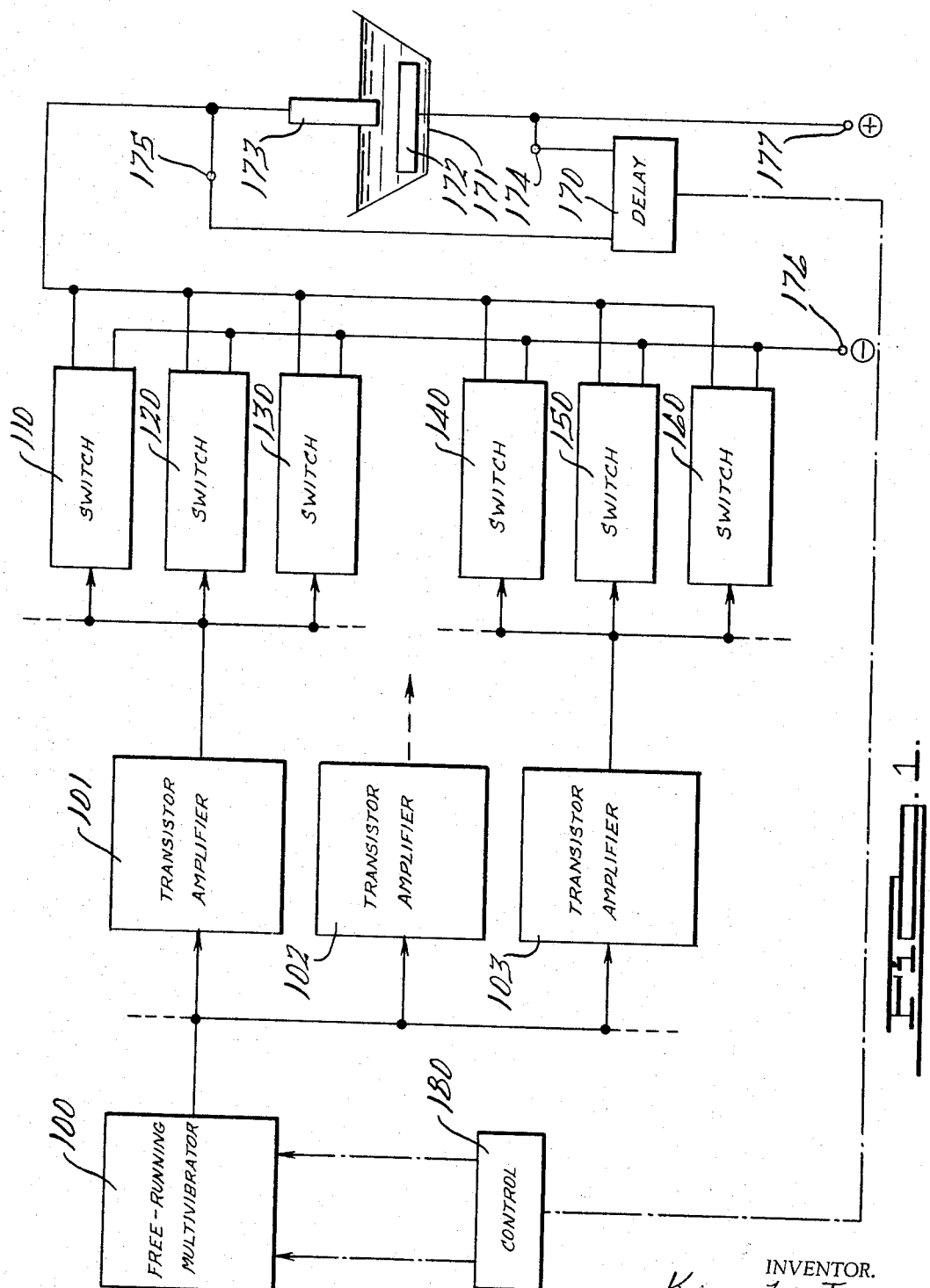

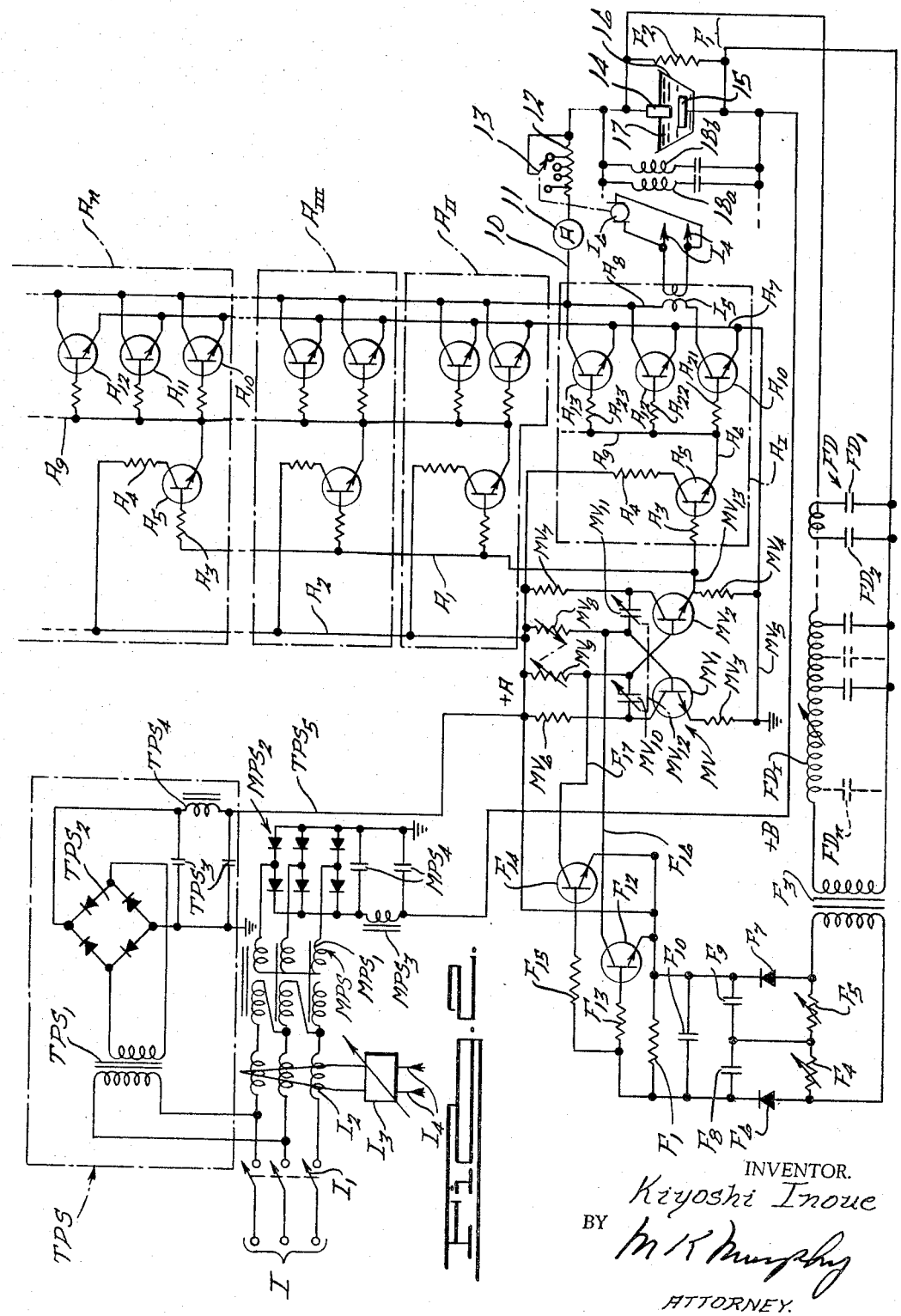

My present invention relates to electrical discharge machining apparatus for use in the EDM or ECDM (electrochemical-discharge machining) of metallic workpieces whereby a spark discharge is effected between an electrode and a conductive workpiece and material of the workpiece is eroded by such discharge. More particularly, the present invention relates to improvements in pulse generating power supplies for such machining apparatus.

In the last decade, there have been many advances in the art of electrical discharge machining of conductive workpieces and in the combining of an electrical discharge machining procedure with an electrochemical machining of workpiece material in order to improve the efficiency of the machining apparatus and increase the rate of removal of material. Considerable effort has gone into the development of effective control systems for the power supplies of such apparatus whereby, for example, the discharge rate, the peak current, the pulse frequency, and the discharge power can be regulated selectively in accordance with the requirements of the particular machining operation. In the simplest terms, an apparatus for the electrical discharge machining of a conductive workpiece has generally comprised a power supply for applying electrical pulses across an electrode gap between a machining electrode and the workpiece, generally in the presence of a liquid which removes the machining detritus. Prior power supply systems can generally be divided into two types, namely, the capacitive-discharge type and the electrodynamic pulse generator type. In the former, a direct current source is connected across a discharge capacitor or capacitor bank and such capacitor means discharges across the electrode gap when the condenser potential attains the breakdown voltage of the gap. It is thus apparent that the machining power of the apparatus determines the size of the capacitors to be used and that the power is related to the confronting surfaces of the electrode tools and the workpiece defining the machining area. When larger capacitors are employed, the sources of charging current must be correspondingly larger if the charging time is not to render the entire operation so slow as to be uneconomical. In electrodynamic pulse generators, a rotor or armature having angularly spaced magnetic formations is rotated through a magnetic field or a rotating field sweeps the magnetically permeable bodies and the pulse frequency is a function of the angular velocity of the rotor and the number of formations disposed about its circumference. In my U.S. Patent No. 3,089,018, for example, there is disclosed and claimed a power supply of the first-mentioned type while my Patents No. 3,098,164 and No. 3,098,174 disclose and claim arrangements of the electrodynamic type. While these systems are highly effective for most purposes, it has long been desired to provide an easily controllable pulse generator of relatively small dimensions and low cost which is yet capable of providing practically unlimited discharge power to the machining gap.

It is, therefore, an important object of the present invention to provide a relatively compact pulse generating power supply for electrical discharge machining in which the dimension problems involved in capacitive-discharge and electro-dynamic power supplies can be obviated.

Still another object of this invention is to provide an EDM apparatus having a relatively low cost and yet highly versatile pulse generator.

A further object of my invention is to provide a pulse generator for electrical discharge machining which is readily controlled with respect to frequency and power and yet does not require the massive capacitive banks, rotor-type generators or large switch assemblies necessitated by earlier systems.

These objects and others which will become apparent hereinafter are attained, in accordance with the present invention, by a solid-state pulse generator power supply which comprises a source of DC machining current connected across the machining electrode and the conductive workpiece through electronic switch means operatively coupled to a source of triggering pulses. I have found that extremely high discharge powers and, effectively, unlimited discharge energy, can be controlled by the electronic switch means without significant internal dissipation or the need for massive power transistors and heat sinks when the electronic switch means comprises a plurality of switching transistors whose emitter-collector electrodes are in parallel with one another and further connected in series with the machining electrode, the workpiece and the machining power supply. The bases or control electrodes of the transistor may be energized simultaneously from the source of triggering pulses which may be an oscillator of relatively low power capacity. Each of the transistors is also of relatively low capacity, the total power controlled by the electronic switch means being directly proportional to the number of transistors connected as described.

According to a more specific feature of the present invention, the pulse train is produced by a free-running transistor multivibrator whose output is connected to the switching transistor via an intermediate amplifier stage which converts the sawtooth output of the multivibrator into a train of square pulses whose pulse duration determines the length of the conductive period of the transistor switches. Advantageously, the transistor switches with their collector emitter electrodes connected in parallel are subdivided into a plurality of circuits, each having a respective common emitter amplifier transistor, the amplifying transistors having their control elements, in turn, connected in parallel to the output of the multivibrator. At least one resonant LC network is connected across the machining gap to provide a series of oscillatory follow-up pulses for each of the machining pulses provided by operation of the transistor switches.

According to a further specific feature of the present invention, the system is regulated by feedback tapped across the machining gap and applied via respective amplifiers to the control elements of the two multivibrator transistors to regulate the firing thereof and thus the relative heights and spacings of the sawtooth pulses at the output. Machining power control of the system in accordance with the present invention can be effected by a means for detecting the mean current through one of the branches of the transistor-switching circuit and using the detected mean current to control the potential of the machining-discharge source via the selective interposition of resistive means via a saturable reactor as disclosed, for example, in my Patent No. 3,089,018.

The above and other objects, features and advantages of the present invention will become more readily apparent from the following description, reference being made to the appended drawing in which:

FIG. 1 is a block diagram illustrating the basic components of a machining apparatus in accordance with the present invention; and FIG. 2 is a circuit diagram of the power supply system.

From FIG. 1, it will be seen that the basic elements of an electrical discharge machining apparatus include an electrode tool 173 which can be advanced in the direction of the conductive workpiece 172 by a servocontrol system as described in my Patent No. 3,089,018 to maintain the machining gap width constant. The electrode and the workpiece are preferably immersed in a dielectric liquid which can be circulated as described in my copending applications Ser. No. 349,458 and Ser. No. 323,042, filed Mar. 4, 1964 and Nov. 12, 1963, respectively, to carry away the machininng detritus within the vessel 171. A discharge machining power supply is adapted to apply a large DC current to the machining gap via the terminals 176 and 177, the latter being connected in series with the workpiece 172, the electrode 173 and an electronic switch means consisting of a multiplicity of transistor switches 110, 120, . . . 160. These switches are subdivided into groups 110, 120, 130 and 140, 150, 160 in which their control elements are connected in parallel to respective transistor amplifiers 101, 102, 103 . . . . The amplifier transistors, in turn, are energized in parallel by a free-running multivibrator 100 whose transistors have their firing or switchover points connected in circuit with an electronic control amplifier 180 which, in turn, is energized over a pulse shaping and adjustable delay circuit 170 in a feedback from the terminals 174 and 175 across the machining gap. It has been found that ten transistor switches can be associated effectively with each transistor amplifier stage and that at least six such amplifier stages afford an excellent switching arrangement for large machining powers capable of operation at frequencies between 0.5 kilocycle and 15 megacycles. The sixty transistors are of relatively low cost, require little space, have low thermal dissipation and can deliver currents of up to 400 amps and apply voltages of up to 50 volts to the machining gap.

Referring now to FIG. 2, wherein the power supply circuitry is shown in greater detail, it will be seen that the system includes a machining power supply MPS energized via a three-phase alternating-current input I via a switch $I_1$, and a three-phase saturable-core reactor $I_2$ whose control voltage is supplied by a control unit $I_3$ having input lines $I_4$. The main power supply MPS comprises a three-phase stepdown transformer $MPS_1$, and a full-wave rectifier $MPS_2$ whose negative output terminal is grounded while the positive terminal, capable of delivering, say, 50 volts at 300–400 amps, is connected via the smoothing choke $MPS_3$ and the filtering capacitors $MPS_4$ to the workpiece 15 within the vessel 16. The electrode 14 is juxtaposed with the workpiece within the dielectric liquid 17 to provide the machining gap.

The power supply TPS for the transistors of the electronic switching circuit includes a single-phase transformer $TPS_1$ and a rectifier bridge $TPS_2$ whose negative side is grounded while its positive terminal is led to the transistor busbar $+A$ via a filter choke $TPS_4$ and a pair of filter condensers $TPS_3$, the output line being designated $TPS_5$.

The solid-state multivibrator MV for triggering the switching transistors comprises a pair of NPN transistors $MV_1$, $MV_2$ whose emitters are connected to ground through the bias resistors $MV_3$ and $MV_4$, the ground busbar being shown at $MV_5$. The high voltage side of the transistor power supply TPS is applied to the multivibrator transistors via the collector resistors $MV_6$ and $MV_7$, while cross-coupled RC circuits $MV_9$, $MV_{10}$ and $MV_8$, $MV_{11}$, respectively, serve to control the conduction times of the multivibrator in a conventional manner. It has been found advantageous to couple the resistive impedances and/or the capacitive impedances of these time-constant networks, as represented at $MV_{12}$, to ensure the maintenance of the predetermined pulse relationship.

The resulting train of pulses, derived at the output line $MV_{13}$, is applied to the main signal busbar $A_1$ of a multiplicity (e.g. six) of electronic-switching circuits $A_I$, $A_{II}$, $A_{III}$ . . . $A_n$, the actual number being determined in accordance with the number of switching transistors per circuit, the individual current-carrying capacity of each transistor, and the total current to be delivered during the machining pulses.

Each of the electronic-switching circuits $A_I$, $A_{II}$ . . . comprises a multiplicity of switching transistors $A_{10}$, $A_{11}$, $A_{12}$, $A_{13}$ . . . whose collector-emitter electrodes are connected in parallel across a pair of lines $A_7$ and $A_8$, the former being connected to ground via busbar $MV_5$ while the latter is connected to the electrode 14 via a line 10, an ammeter 11, and a variable resistor 12. The collector-emitter electrodes of these transistors $A_{10}$, $A_{11}$ etc. are thus connected in series between ground and electrode 14 while the machining current is applied to the workpiece 15 by the line $+B$ and returned to ground at the machining power supply MPS. Each of the transistors $A_{10}$, $A_{11}$ etc. of each switching circuit $A_I$, $A_{II}$ etc. has its control electrode or base in circuit with a biasing resistor $A_{21}$, $A_{22}$, $A_{23}$ . . . and connected in parallel with a line $A_9$ to which the output terminal $A_6$ of a respective amplifier transistor $A_5$ is connected. The latter transistors have their base-bias transistors $A_3$ connected to the signal line $A_1$ described above. The collectors of the transistors $A_5$ are, in turn, connected through the biasing resistors $A_4$ to the high-voltage side of the transistor power supply TPS along the line $+A$.

Across the machining gap, I provide a plurality of tuned series-resonant networks $18a$, $18b$ . . . of inductive and resistive impedance to sustain the discharge oscillation and to provide a series of oscillatory pulses of successively decreasing amplitude after each of the main machining pulses provided by the transistor switches. The frequency of oscillations is substantially in excess of that of the main machining pulses. Where several resonant networks are provided across the gap, these may be of slightly varying frequencies. This type of machining with independently generated machining pulses of essentially square shape combined with the oscillatory follow-up pulses has been found to provide substantially improved operation with regard to increased machining rate and improved surface finish attainable. Parallel-resonant tuned circuits may also be employed as described in U.S. Patent No. 3,087,044. Control of the machining power is effected by detecting the frequency of discharge by a frequency meter of other means responsive to the repetition rate of the discharge. Since the repetition rate is proportional to the mean current, it is possible to use the latter as the measure of frequency of control of the main power supply MPS. For this purpose, a current transformer $I_5$ can be connected in one branch of the transistor system so that it need be only of the capacity of this branch. The current transformer $I_5$ has its terminals $I_4$ connected with the control unit $I_3$ which generates the direct-current control voltage applied to the saturable reactor $I_2$. Thus, the discharge power may be maintained constant by the control circuit $I_3$ which compares the output of the current transformer $I_5$ with an adjustable reference to generate the control voltage for the saturable reactor. Another type of control is also possible, i.e. by varying the resistance of the series circuit in which the electrode is connected. For this purpose, the tapped resistor 12 is provided, while a switch 13 is designed to selectively shunt the resistor sections as controlled by a rotary solenoid $I_6$ energized by the current transformer $I_5$. As the current increases beyond the desired level, solenoid $I_6$ is energized to shunt less of the resistor 12.

The duration of the current pulses applied by the transistors $A_{10}$, $A_{11}$ etc. to the gap is controlled by turning On and Off the multivibrator MV. For this purpose, a high-ohmic load resistor $F_2$ is connected across the feedback terminals $F_1$ which, in turn, are connected across the gap. A pulse-shaping adjustable delay line FD is energized by the feedback signal and comprises a series connected adjustable inductance FDI and a multiplicity of capacitances $FD_1$, $FD_2$ . . . $FD_n$ in a delay line configuration with the inductance. The delay line FD is inductively coupled by a transformer $F_3$ to an integrator $F_{10}$, $F_{11}$, via the rectifiers $F_6$ and $F_7$ and a voltage divider $F_4$ and $F_5$. Condenser $F_{10}$ is charged by the balance voltage of the detected voltages in condensers $F_8$ and $F_9$ and its terminal voltage. It will be apparent that the substantially unipolar pulse applied to the delay line is converted by it and the transformer $F_3$ into spaced pulses of opposite polarity substantially in the cadence of the output spikes of the multivibrator; these pulses are rectified at $F_6$ and $F_7$. The transistor amplifiers $F_{12}$ and $F_{14}$, whose biasing resistors are shown at $F_{13}$ and $F_{15}$, respectively, channel triggering pulses via lines $F_{16}$ and $F_{17}$ to the RC circuits of the respective multivibrators $MV_2$ and $MV_1$, to advance or retard the firing times. By control of the delay line, the timing of the pulses and thus the duration of the machining pulses and their frequency can be established at any desired level.

It will be understood that the power supply of the present invention is designed to be used with EDM and ECDM apparatus of the type described in the above-mentioned patents and copending applications and that the servomechanism for electrode control, the circulating systems for the dielectric liquid and the electrode materials of these applications are usable with the power supply of the present invention.

The invention described and illustrated is believed to admit of many modifications within the ability of persons skilled in the art, all such modifications being considered within the spirit and scope of the present invention.

I claim:

1. In an apparatus for machining a conductive workpiece by intermittent electrical discharge across a gap between an electrode and the workpiece in the presence of a dielectric coolant, a machining power circuit for supplying machining power pulses to said gap comprising a power supply, a periodically operated electronic switching means having principal electrodes connected in a series circuit between said power supply and said gap, a variable magnitude resistor connected in said series circuit with said gap, current sensing means coupled to said series circuit for providing an output signal responsive to abnormal gap characteristic, and means coupling said sensing means to said resistor for selectively increasing the magnitude of said resistor to limit gap current flow responsive to said signal.

2. In an apparatus for machining a conductive workpiece by intermittent electrical discharge across a gap between an electrode and the workpiece in the presence of a dielectric coolant, a machining power circuit for supplying machining power pulses to said gap comprising a power supply, a periodically operated electronic switching means having principal electrodes connected in series circuit between said power supply and said gap, a resistor connected in said series circuit with said gap, current sensing means coupled to said series circuit for providing an output signal which is a function of gap current and a second switching means connected to the output of said sensing means and across said resistor for shunting current flow about at least a portion of said resistor responsive to gap current below a predetermined level.

References Cited

UNITED STATES PATENTS

| | | | |
|---|---|---|---|
| 2,895,080 | 7/1959 | Branker | 315—209 |
| 2,951,972 | 9/1960 | Pomazal | 219—131 |
| 3,087,044 | 4/1963 | Inoue | 315—227 |
| 3,267,327 | 8/1966 | Webb | 315—209 |
| 3,289,040 | 11/1966 | Pafau et al. | 315—227.1 |

JOHN W. HUCKERT, *Primary Examiner.*

J. D. CRAIG, *Assistant Examiner.*

REEXAMINATION CERTIFICATE (562nd)

United States Patent [19]

Inoue

[11] B1 3,360,683

[45] Certificate Issued  Sep. 16, 1986

[54] SOLID-STATE PULSE GENERATOR FOR ELECTRIC-DISCHARGE MACHINING

[76] Inventor: Kiyoshi Inoue, 100 Sakato, Kawasaki, Kanagawa, Tokyo, Japan

Reexamination Request:
No. 90/000,773, May 6, 1985

Reexamination Certificate for:
Patent No.: 3,360,683
Issued: Dec. 26, 1967
Appl. No.: 493,473
Filed: Oct. 6, 1965

[51] Int. Cl.⁴ .................................... B23P 1/08
[52] U.S. Cl. ............ 315/209 R; 315/227 A;246;289; 219/69 C;69 P
[58] Field of Search .................. 219/69 C, 69 S, 69 P, 219/69 G; 315/227 A, 246, 289, 209 R

[56] References Cited

U.S. PATENT DOCUMENTS

| | | | |
|---|---|---|---|
| 2,769,078 | 10/1956 | Matulaitis | 219/69 |
| 2,895,080 | 7/1959 | Branker | 315/205 |
| 2,951,972 | 9/1960 | Pomzal | 315/311 |
| 3,087,044 | 4/1963 | Inoue | 219/69 |
| 3,267,327 | 8/1966 | Webb | 315/127 |
| 3,289,040 | 11/1966 | Pfau et al. | 315/307 |

FOREIGN PATENT DOCUMENTS 34-5048  6/1959  Japan .

*Primary Examiner*—M. H. Paschall

EXEMPLARY CLAIM

1. In an apparatus for machining a conductive workpiece by intermittent electrical discharge across a gap between an electrode and the workpiece in the presence of a dielectric coolant, a machining power circuit for supplying machining power pulses to said gap comprising a power supply, a periodically operated electronic switching means having principal electrodes connected in a series circuit between said power supply and said gap, a variable magnitude resistor connected in said series circuit with said gap, current sensing means coupled to said series circuit for providing an output signal responsive to abnormal gap characteristic, and means coupling said sensing means to said resistor for selectively increasing the magnitude of said resistor to limit gap current flow responsive to said signal.

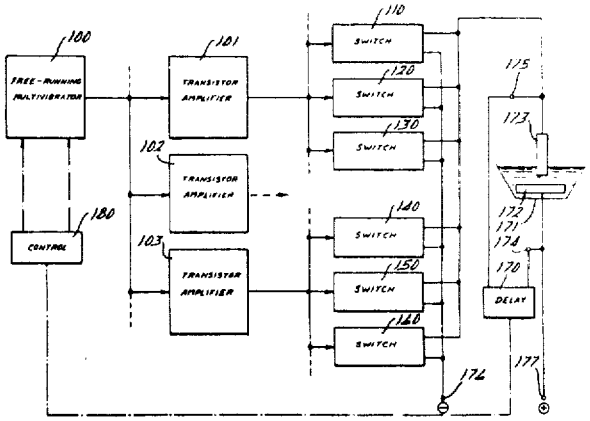

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claim 1-2 is confirmed.

* * * * *